Nov. 25, 1952  F. L. WENHAM ET AL  2,619,363
VEHICLE SPLASH GUARD
Filed Oct. 26, 1951

INVENTOR.
Fred L. Wenham and
BY Samuel J. Kosik, Jr.
Robb & Robb
Attorneys

Patented Nov. 25, 1952

2,619,363

UNITED STATES PATENT OFFICE 2,619,363

VEHICLE SPLASH GUARD

Fred L. Wenham, Shaker Heights, and Samuel J. Kosik, Jr., Cleveland, Ohio, assignors to Wenham Supply Company, Cleveland, Ohio, a corporation Application October 26, 1951, Serial No. 253,316

3 Claims. (Cl. 280—154.5)

This application relates to vehicle splash guards, and more particularly to improvement therein, which make the same adaptable for many types of vehicles, and also improve the characteristics thereof, which resist wear.

Heretofore, vehicle splash guards of the class to which this invention is directed, have been formed of flat sheets of rubber-like material, and secured in any suitable manner, at the rear of the vehicles to which the same are applicable, the purpose of the splash guard being to prevent the excessive amount of moisture or dirt or other foreign material, from being thrown onto the windshield or other front portion of a vehicle following.

In general such splash guards have been used on heavy trucks and trailers which include dual tires and wheels, and thereby of course pick up and throw rearwardly a large amount of the foreign material, dirt and other matter, which under certain conditions can become dangerous, causing the driver of the vehicle following to lose control or to otherwise have his vision obscured so as to be a potential accident hazard upon the highway.

Since it is desirable to have the splash guards of the class herein being discussed, of flexible material, by reason of the fact that vehicles must be maneuvered into various positions, the same have been formed of rubber or the like. As a result of this use of the flexible material, many occasions arise upon which the said material is cut or otherwise damaged so as to require the replacement of such flaps, the same being relatively expensive and desirably not to be replaced for relatively minor damage. However, with the use of rubber and other material which is not so expensive as to prohibit their use, under many conditions a slight tear or other cut in the flap may cause the same to rip entirely across the flap and thus be rendered useless.

Additionally, during the use of the flaps in their attached condition, the same being obviously suitably named "flaps" or "splash guards" as the case may be, the forward progress of the vehicle to which the same are attached causes the flap to move into a position, rendering the same useless. In other words, the condition exists that is called "tail-gating," the position of the flap being that of a relatively horizontal nature, caused by the wind or air passing the same and bending the same upwardly and rearwardly about its point of connection to the vehicle body.

It is therefore a principal object of this invention, to provide a flap or splash guard which will be relatively impervious to destruction by slight cuts or tears and furthermore may be easily repaired if such take place under operating conditions.

It is a still further object of this invention to construct a flap or splash guard which will contain therein the necessary reinforcing means, which will resist destruction of the splash guard by cuts or other foreign substances, and yet remain flexible for purposes of use.

It is a still further object of this invention to provide a splash guard of the class described, which may be simply manufactured, so as to incorporate therein a wire reinforcing mesh member, which member is flexible and yet does not materially increase the cost of the flap, at the same time materially increasing the life thereof.

It is a still further object of this invention to construct a flap or splash guard, which incorporates therein novel means for preventing undesirable displacement of portions of the flap or guard during travel movement, caused by the passage of air under normal condition, this condition being known as "tail-gating."

It is a still further object of this invention to construct a flap having suitable mounting means incorporated therein and including in the formation of the flap air passages which permit a certain portion of the air to pass through the flap and assist in maintaining the same in its position for effectively preventing the rearward movement of water or the like without destroying the effectiveness of the flap or guard.

It is a still further object of this invention to provide the air passages above referred to, in a manner so as to prevent the increase in size thereof, which might destroy the effectiveness of the flap as an anti-splash control member, and in addition to provide the mounting means for the flap in a manner to effectively maintain the flap in its location throughout the life thereof.

It is a still further object of this invention, to provide the mounting means with additional reinforcing construction, which will prevent the same from being ripped or otherwise torn so as to permit the flap to be displaced from its operating position, the said secondary reinforcing means being availed of in addition to the reinforcing means for the flap as a whole, in effect thus providing additional desirable characteristics, whereby this said flap becomes increasingly efficient as relates to its cost.

Other and further objects of this invention will be set forth in the appended specification and are disclosed in the drawing wherein Figure 1 is a side elevation view, partly fragmentary, illustrating the general location of the flap or splash guard, together with certain features of operation which render the flap additionally effective.

Figure 1:
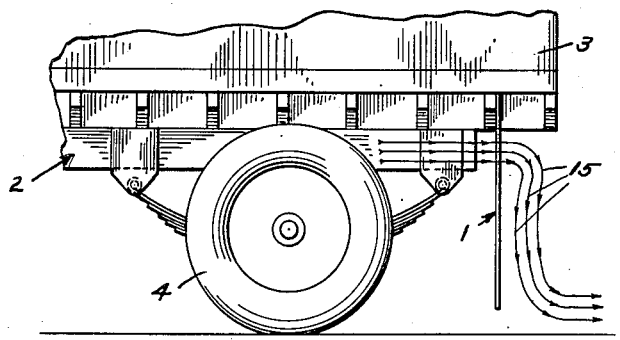
Figures 3, 4:
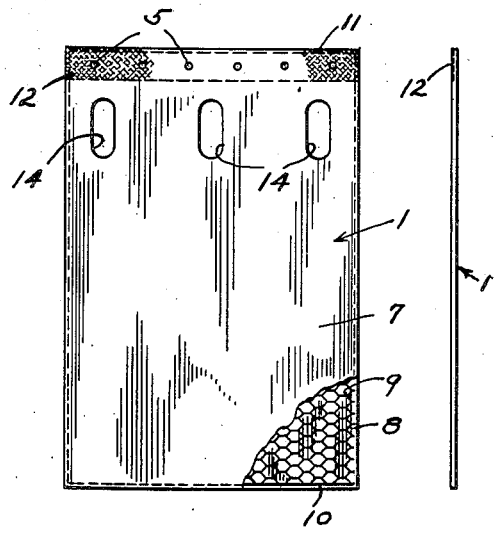
Figure 3 is a plan view of the flap or guard itself, part of the same being broken away so as to illustrate the reinforcement therein.
Figure 4 is an edge view of the flap, in order to illustrate proportions in general.

Referring now to Figures 1 and 3, particularly, the flap of this invention is generally designated 1, and is shown as being mounted at the rear and depending from the body of a vehicle generally designated 2. The vehicle of course includes therein a body designated 3, shown as being mounted upon a suitable frame work and supported on wheels designated 4, the same being in this particular instance, the usual dual wheels often used in heavy vehicles.

Flap 1 is suitably fastened to the body 3 or to any other suitable portion of the vehicle, rearwardly of the said wheels 4, and by means of openings 5 provided in the upper edge of the flap, the flap is of course intended to depend from the vehicle body 3, sufficiently close to the wheels 4, so as to prevent the flowing of mud or water onto the windshield or forward part of the vehicle following said vehicle 2, in order to prevent the obscuring of the vision of the driver of the said vehicle following.

Figure 2:
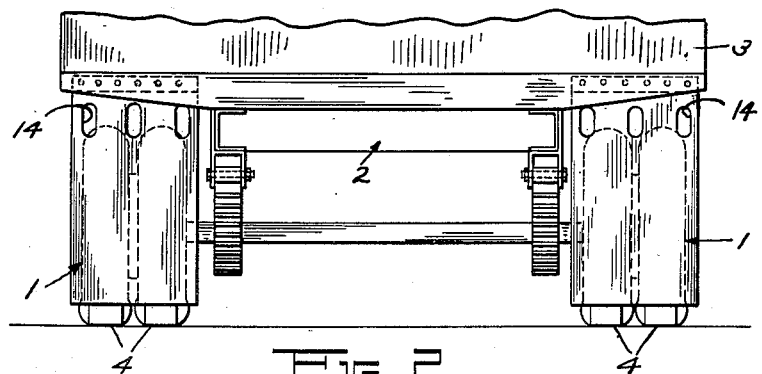
Figure 2 is a rear view in elevation, also partly fragmentary, illustrating the usual manner of mounting flaps of this invention in place upon a vehicle, with the relationship of certain of the various components being illustrated.

As indicated in Figure 2, the said flap 1, is generally provided in pairs, so as to effectively prevent the splashing of water or the like, the said flap 1, being mounted in the same manner at each side of the vehicle, and adjacent the wheels therefor.

Figure 5:
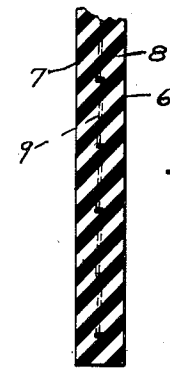
Figure 5 is an enlarged sectional view of the flap showing the location of the reinforcement therein as respects the faces of the flap.

Referring now particularly to Figure 3, and also to Figure 5, the said flap is shown as being comprised of rubber or the like material, and having a main body portion generally designated 6. The body portion or member 6, may be formed in any preferable manner, but in this instance we show the same as having been initially comprised of two separate relatively thin flat sheet sections 7 and 8, which sheet sections 7 and 8 have had inserted between the same, a wire mesh reinforcing member designated 9, which reinforcing member 9 is of substantially the same size as the sheets 7 and 8 so as to extend throughout the same, and yet be entirely confined therewithin. A suitable wire reinforcing mesh material may be that known as "chicken wire" the same having a selvedge 10 at the upper and lower edges 10 and 11, thereof, for purposes which will be hereinafter referred to.

With the sheets 7 and 8 being provided, the same being obviously of substantially rectangular configuration, and the wire reinforced mesh member 9 being available, the said reinforcing mesh member 9 is inserted between sheets 7 and 8, and thereafter by known processes of heating and curing the material the said mesh becomes an integral part of the flap or body member as will be readily appreciated. Of course, it is within the purview of this invention to form the flap body 6 in any other manner, but we have shown at least one preferred form thereof and described the same in conjunction with the drawing Figure 3 and Figure 5. Under many conditions and desirably, the flap may be provided at its upper edge with an additional reinforcing material, which in suitable circumstances will be what is known as a duck reinforcing material, which is similarly molded into and becomes an integral part of the said flap body 6, the said duck reinforcing being designated 12. It is of course understood that the duck reinforcing may be molded into the material so as to entirely penetrate and be integral with the upper edge of the said flap body 6, or the same may be provided in relatively thin strips on one side of the upper edge as illustrated in Figure 4, or suitably occupying a similar position opposite that illustrated in Figure 4. It is of course apparent that this additional duck reinforcing 12 is adjacent to and extends along and covers the selvedge edge 11 of the upper edge of the wire reinforcing mesh member 9, and thus becomes a secondary or additional reinforcement for maintaining the flap or splash guard in its position when in use. The usual holes 5 are provided in the upper edge of the flap, the same penetrating the duck reinforcing 12, and also passing through and between the opening in the wire reinforcing mesh 9, so that the fastening members availed of will not readily be torn from the flap by reason of the strain placed thereon during movement of the vehicle or under other unusual circumstances.

Referring now to Figures 2 and 3, there are shown the air-passage openings in the flap, which openings are designated 14, and in this particular instance being 3 in number. The said openings 14 are suitably formed by punching the same with a punching member of the shape of the openings, after the flap has been made, with the reinforcing member 9, therein. It will therefore be apparent that the punching of the openings 14 will likewise have caused a punching or removal of the corresponding portion of the reinforcing member, and thus the reinforcing portions of the member 9 will entirely surround the openings 14 and obviously prevent further increase in the size thereof.

We have found that the openings as illustrated in substantially the proportion illustrated, are suitable for use in the manner to be hereinafter described, although other shapes and arrangements of openings may be availed of within the purview of this invention. The primary purpose of the said openings as will be more explicitly described, is to permit the passage of a sufficient quantity of air through the said openings during travel of the vehicle to which the flaps or guards are attached to prevent the said flaps from assuming a position which is called "tail-gating" which normally renders the said flaps ineffective to carry out their purpose.

Referring now to Figure 1 in the drawing, during operation of the vehicle in its forward progress, it will be apparent that air will be passing by the wheels and toward the flaps 1, said flaps being of sufficient area normally, to resist the passage of water or dirt thrown rearwardly by the vehicle. Since the flaps are flexible the passage of air would normally cause the flaps to move upwardly at their lower ends, away from and toward the rear of the vehicle. Therefore the passages 14 have been provided as previously explained, to permit a quantity of the air to pass through the flaps as illustrated in the drawing by the lines designated 15, at least a portion of the air flow being indicated by the arrows. It will be apparent that during passage of the vehicle 2 in its forward movement a certain amount of vacuum condition is created at the rear of the flaps and the movement of the air in the direction illustrated by the lines 15 will thus be in a somewhat downward and rearward direction. With the foregoing in mind it will be apparent that the passage of the air as indicated by the lines 15 will be downwardly and in sufficiently large quantity to counteract in large measure, the force of the air upon the forward face of the flap and thus place the flap in a relatively stable condition as far as air passage is concerned, since pressure will tend to be equalized both forwardly and rearwardly of the faces of the flap. It will be thus seen that novel provision has been made for counteracting the tailgating tendencies of flaps of this description by provision of the air passages 14.

As has been explained, the provision of the wire reinforcing mesh 9 within the body of the flap will prevent the increase in the size of the openings 14, which would destroy the effectiveness of the flap, and at the same time if other cutting conditions are encountered at the edges or in some other place in the flap, the presence of the reinforcing mesh therein, will prevent the increase in extent of the said cut and thus maintain the flap in its useable condition. Furthermore the said flap may be vulcanized or otherwise suitably repaired before the cut can extend to any great length and thus an improved type of flap or splash guard has been provided by our invention.

Furthermore the provision of the wire-reinforcing mesh, which has selvedge edges at 10 and 11 as previously mentioned, additionally increases the strength of the flap, the said selvedge edge 11 obviously assisting and adding to the resistance of the flap body to a tearing action which would be encountered by the fastening members in the holes 5 in the upper edge of the flap, and furthermore the lower edge of the flap which receives a great deal of abrasive action is additionally reinforced by the selvedge edges.

In view of the foregoing there has been shown and described a novel form of flap or splash guard which while relatively inexpensive to manufacture, materially provides increased life and effectiveness for the purposes of the invention, the effectiveness of the flap in carrying out its intended function being virtually complete.

Having thus shown and described our invention, what we claim as new and desire to secure by Letters Patent of the United States is:

1. A vehicle splash guard of the class described, comprising a substantially rectangular body member of flexible material, mounting means at one end of said body member for supporting the same on a vehicle body, and air passage means formed in said body member adjacent said mounting means.

2. A splash guard as claimed in claim 1, wherein the flexible body member is provided with a mesh reinforcing member molded integrally in said body member and extending substantially throughout the area thereof, and the air passage means comprise a series of elongated openings.

3. A splash guard as claimed in claim 1, wherein the flexible body member is provided with a mesh reinforcing member molded integrally in said body member and extending substantially throughout the area thereof, the air passage means comprise a series of elongated openings, the mounting means comprise a series of spaced holes and additional reinforcing material is molded in said body member at the end where said holes are formed, surrounds said holes and encloses one end of the said mesh reinforcing member, the said elongated openings being surrounded by said mesh reinforcing member.

FRED L. WENHAM.
SAMUEL J. KOSIK, Jr.

REFERENCES CITED

The following references are of record in the file of this patent:

UNITED STATES PATENTS

| Number | Name | Date |
|---|---|---|
| 659,416 | Perry | Oct. 9, 1900 |
| 1,429,805 | Traub et al. | Sept. 19, 1922 |
| 1,602,870 | Villiers | Oct. 12, 1926 |
| 1,933,982 | Jackson | Nov. 7, 1933 |
| 2,054,361 | Cohen | Sept. 15, 1936 |
| 2,405,262 | Lindsay | Aug. 6, 1946 |
| 2,571,627 | Sloman et al. | Oct. 16, 1951 |